March 12, 1957 M. J. ARNOLDUS 2,785,348
ADJUSTING DEVICE FOR A MAGNETIC ELECTRON LENS
Filed May 24, 1955
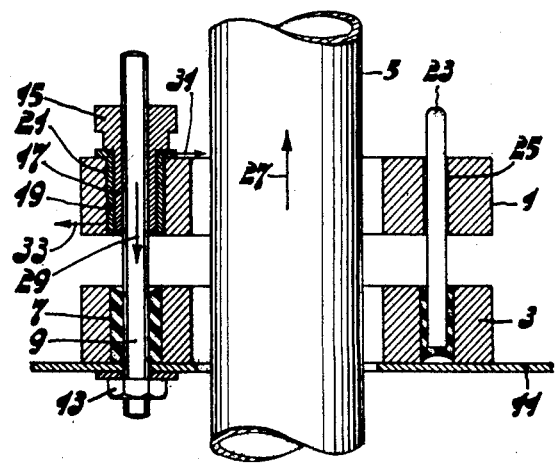
INVENTOR
MENNO JAN ARNOLDUS
BY
AGENT

United States Patent Office 2,785,348
Patented Mar. 12, 1957

2,785,348

ADJUSTING DEVICE FOR A MAGNETIC ELECTRON LENS

Menno Jan Arnoldus, Eindhoven, Netherlands, assignor, by mesne assignments, to North American Philips Company, Inc., New York, N. Y., a corporation of Delaware Application May 24, 1955, Serial No. 510,820

Claims priority, application Netherlands June 3, 1954

2 Claims. (Cl. 317—200)

The invention relates to a device comprising an adjusting screw for displacing a component part, which is subjected to a force which is approximately parallel to the screw and eccentrical thereto, more particularly for use in a magnetic electron lens. In the last-mentioned device the component part to be displaced, for example a permanent magnetic ring surrounding the neck of a cathode-ray tube, is subjected to a magnetic force which may be considered as being applied along the center line of the ring and of the cathode-ray tube. As a matter of course, the adjusting screw must be located outside the cathode-ray tube, i. e. eccentrically relative to the said force and this eccentrical load may give rise to difficulties with the control of the adjusting device.

The invention has for its object to provide a simple device, in which these difficulties do not occur. According to the invention the screw bolt of the adjusting screw is secured at one end to a stationary part of the device, whereas the nut of the adjusting screw is provided with a cylindrical, coaxial prolongation of smaller diameter, which is rotatable in an intimately fitting recess of the component part.

The invention will be described more fully with reference to one embodiment, which is shown in the drawing in an axial sectional view.

The drawing shows a magnetic electron lens, which comprises mainly two permanent magnetic rings 1 and 3, for example made of a ceramic, permanent magnetic material, these rings being magnetized in a conventional manner in an axial direction and facing one another with their identical poles. The rings 1 and 3 surround the neck of a cathode ray tube 5; the electron beam produced therein is concentrated (focussed) by the field of the magnets 1 and 3. The degree of this concentration may be controlled by varying the relative distance between the rings.

To this end a screw bolt 9 is secured in an axial bore 7 of one of the rings, in this case of the ring 3. The ring 3 has a stationary position and may, for example, be supported from a supporting plate 11, to which the ring is secured, for example by means of a nut 13 screwed on one end of the bolt 9. Over the other end of the bolt is displaceable a milled nut 15, which has an axial prolongation (neck) 17 of smaller diameter. This neck fits in a sleeve 19, for example of metal, which is secured in a recess 21 of the ring 1.

Since the two rings repel one another, the structure of the ring 1 and the sleeve 19 remains always urged against the collar formed by the head of the nut 15, even if no particular measures are taken; the distance between the rings may thus be adjusted in a simple manner by turning the nut 15. In order to prevent the ring 1 from rotating with the nut, an axially directed guide pin 23 is secured in the stationary ring 3, this pin projecting through a fitting bore 25 of the ring 1, lying diametrically opposite the recess 21.

The magnetic force acting upon the ring 1 may be represented by an arrow (27) along the center line of the ring; the reactive force is directed according to the arrow 29, going through the axis of the screw bolt 9 and is thus eccentrical relative to the ring 1. The ring is thus subjected to a torque; the reactive torque is constituted by two forces which, on a coarse approximation, may be represented by the arrows 31 and 33. The last-mentioned forces give rise to friction between the guide sleeve 19 and the adjusting screw 9, nut 15 and the frictional forces are found, in practice, to be so high, that, if the nut 15 is not provided with a neck 17, the ring 1 remains "suspended," when the nut is turned upwards, i. e. it does not move upwards in spite of the magnetic force directed upwardly. However, due to the presence of the neck 17, which moves upwardly with the nut 15 and which catches the ring 1, this phenomenon is completely suppressed.

What is claimed is:

1. An adjusting device for displacing a component part of a magnetic electron lens which is subject to an approximately parallel magnetic and eccentrical reactive force relative to said adjusting device comprising at least one annular magnet having an aperture disposed radially from the center of said magnet, a sleeve in said aperture, an adjusting screw bolt in said aperture, a supporting plate, means removably securing said adjusting screw bolt to said supporting plate, a nut on said adjusting screw bolt having a shoulder bearing on said annular magnet, said adjusting nut being provided with a coaxial extension fitting in said sleeve having an axial dimension which is larger than the diameter of said extension, and means connecting said supporting plate to said annular magnet for preventing the latter from rotating when said nut is turned.

2. An adjusting device as set forth in claim 1 wherein two, axially-magnetized, annular permanent magnets are spatially arranged to repel one another, one of said permanent magnets being fixed to said supporting plate, said sleeve being metal and secured in said radially disposed aperture in the other of said permanent magnets.

References Cited in the file of this patent

UNITED STATES PATENTS 2,581,657     Heppner _____ Jan. 8, 1952

FOREIGN PATENTS 657,234     Great Britain _____ Sept. 12, 1951